US011038452B2

(12) United States Patent
Lin et al.

(10) Patent No.: US 11,038,452 B2
(45) Date of Patent: Jun. 15, 2021

(54) MOTOR CONTROL SYSTEM AND METHOD

(71) Applicant: National Central University, Taoyuan (TW)

(72) Inventors: Faa-Jeng Lin, Taoyuan (TW);
Shih-Gang Chen, Taoyuan (TW);
Chia-Hui Liang, Taoyuan (TW)

(73) Assignee: National Central University, Taoyuan (TW)

( * ) Notice: Subject to any disclaimer, the term of this patent is extended or adjusted under 35 U.S.C. 154(b) by 8 days.

(21) Appl. No.: 16/695,117

(22) Filed: Nov. 25, 2019

(65) Prior Publication Data
US 2021/0135613 A1    May 6, 2021

(30) Foreign Application Priority Data

Oct. 31, 2019  (TW) .............................. 108139564.0

(51) Int. Cl.
| H02P 21/14 | (2016.01) |
| H02P 21/18 | (2016.01) |
| H02P 21/22 | (2016.01) |

(52) U.S. Cl.
CPC ............ *H02P 21/141* (2013.01); *H02P 21/18* (2016.02); *H02P 21/22* (2016.02)

(58) Field of Classification Search
CPC .......... H02P 21/00; H02P 21/14; H02P 21/20; H02P 6/10; H02P 25/08; H02P 7/29; H02M 3/158
See application file for complete search history.

(56) References Cited

U.S. PATENT DOCUMENTS 6,396,229 B1 *  5/2002  Sakamoto ................. H02P 6/18
                                                318/400.02
8,736,206 B2 *  5/2014  Kono ...................... H02P 21/18
                                                318/400.02
(Continued)

FOREIGN PATENT DOCUMENTS

| CN | 102025310 A | 4/2011 |
| CN | 107017810   | 8/2017 |

(Continued)

OTHER PUBLICATIONS

W. Zeng, C. Liu, Q. Zhou, J. Cai and L. Zhang, "A new flux/current method for SRM rotor position estimation," 2009 International Conference on Electrical Machines and Systems, Tokyo, 2009, pp. 1-6, doi: 10.1109/ICEMS.2009.5382665. (Year: 2009).*

(Continued)

*Primary Examiner* — Said Bouziane
(74) *Attorney, Agent, or Firm* — CKC & Partners Co., LLC

(57) ABSTRACT

A motor control system includes a motor and a processor, and the processor is electrically connected to the motor. The processor performs the following actions: calculating the d-axis magnetic flux and the q-axis magnetic flux in a synchronous rotating reference frame according to the information fed back by the motor; multiplying the d-axis magnetic flux and the q-axis magnetic flux by a d-axis current feedback and a q-axis current feedback to be a d-axis flux-current product and a q-axis flux-current product respectively; subtracting the q-axis flux-current product from the d-axis flux-current product to get a flux-current product error; sending the flux-current product error to a proportional-integral controller to generate a present compensation current-angle command; adding the present compensation current-angle command and a previous current-angle command to obtain the present current-angle (Continued)

command; sending the present current-angle command to a d-q axis current regulator for processing.

8 Claims, 3 Drawing Sheets

(56) References Cited

U.S. PATENT DOCUMENTS

| | | | | |
|---|---|---|---|---|
| 9,287,811 | B2* | 3/2016 | Osamura | H02P 21/141 |
| 9,379,657 | B2 | 6/2016 | Lipo et al. | |
| 10,003,287 | B2* | 6/2018 | West | H02P 29/60 |
| 2004/0195993 | A1* | 10/2004 | Yoshimoto | H02P 21/06 318/802 |
| 2008/0129243 | A1* | 6/2008 | Nashiki | H02K 1/246 318/701 |
| 2011/0204831 | A1* | 8/2011 | Iwaji | H02P 21/04 318/244 |
| 2013/0002173 | A1* | 1/2013 | Baglino | B60L 58/25 318/139 |
| 2013/0175955 | A1* | 7/2013 | Son | H02P 21/14 318/400.02 |
| 2020/0127588 | A1* | 4/2020 | Secrest | B60L 15/20 |

FOREIGN PATENT DOCUMENTS

| | | |
|---|---|---|
| TW | 451548 B | 8/2001 |
| TW | 201715837 A | 5/2017 |
| TW | 201830845 A | 8/2018 |

OTHER PUBLICATIONS

P. R. Ghosh et al., "Performance comparison of different vector control approaches for a synchronous reluctance motor drive," 2017 6th International Conference on Computer Applications in Electrical Engineering-Recent Advances (CERA), pp. 320-325, Oct. 2017.

R. R. Moghaddam et al., "Theoretical and experimental reevaluation of synchronous reluctance machine," IEEE Transactions on Industrial Electronics, vol. 57, No. 1, pp. 6-13, Jan. 2010.

A. S. O. Ogunjuyigbe et al., "Analysis of synchronous reluctance machine with magnetically coupled three-phase windings and reactive power compensation," IET Electric Power Applications, vol. 4, No. 4, pp. 291-303, Apr. 2009.

* cited by examiner

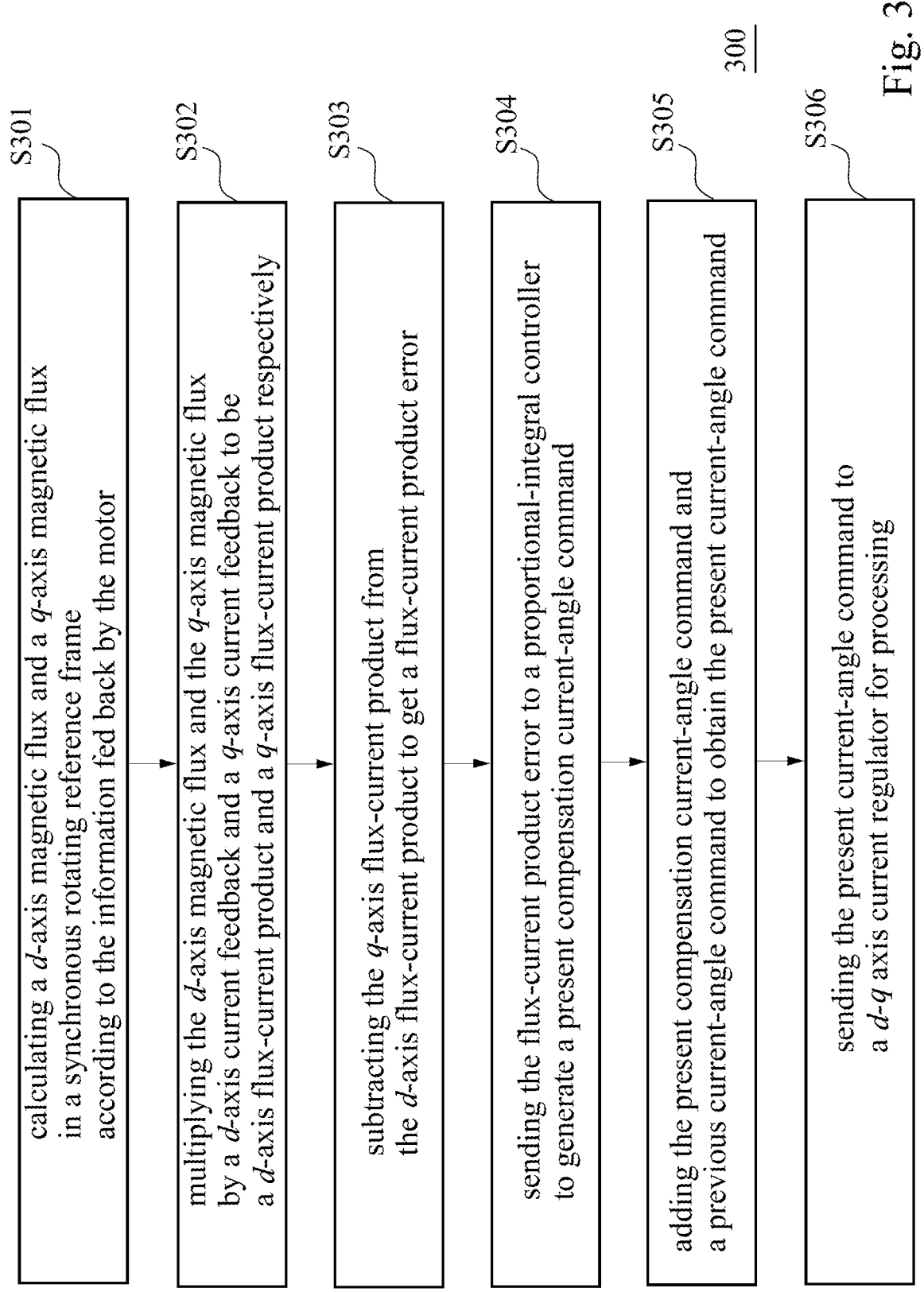

MOTOR CONTROL SYSTEM AND METHOD

This application claims priority to Taiwan Application Serial Number 108139564, filed Oct. 31, 2019, which is herein incorporated by reference.

BACKGROUND

Field of Invention

The present invention relates to motor control systems and methods. More particularly, the present disclosure relates to a maximum power factor control system and method for a synchronous reluctance motor.

Description of Related Art

A motor is an electrical device that converts electrical energy into mechanical energy and can use mechanical energy to generate kinetic energy to drive other devices. Most electric motors get power through magnetic fields and winding currents.

However, the conventional motor maximum power factor control method requires offline pre-preparation and cannot perform immediately automatic adjustment online. Therefore, it is difficult to improve the performance of the maximum power factor control.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a motor control system and a motor control method, to solve or circumvent aforesaid problems and disadvantages in the related art.

An embodiment of the present disclosure is related to a motor control system including a motor and a processor, and the processor is electrically connected to the motor. The processor performs the following actions: calculating the d-axis magnetic flux and the q-axis magnetic flux in a synchronous rotating reference frame according to the information fed back by the motor; multiplying the d-axis magnetic flux and the q-axis magnetic flux by a d-axis current feedback and a q-axis current feedback to be a d-axis flux-current product and a q-axis flux-current product respectively; subtracting the q-axis flux-current product from the d-axis flux-current product to get a flux-current product error; sending the flux-current product error to a proportional-integral controller to generate a present compensation current-angle command; adding the present compensation current-angle command and a previous current-angle command to obtain the present current-angle command; sending the present current-angle command to a d-q axis current regulator for processing.

In one embodiment, the processor further performs the following actions: multiplying a present stator resistance estimating value by a α-axis current feedback in a stationary reference frame to obtain a α-axis resistance current product; multiplying a present stator resistance estimating value by a β-axis current feedback in a stationary reference frame to obtain a β-axis resistance current product; subtracting the α-axis resistance current product and the β-axis resistance current product from a α-axis voltage command and a β-axis voltage command to obtain an α-axis back electromotive force and a β-axis back electromotive force; transmitting the α-axis back electromotive force and the β-axis back electromotive force to integrators to generate a α-axis magnetic flux and a β-axis magnetic flux, respectively; transforming the α-axis magnetic flux and the β-axis magnetic flux into the d-axis magnetic flux and the q-axis magnetic flux through a coordinate axis transformation of α-β axis to d-q axis and an electrical angle.

In one embodiment, the processor further performs the following actions: calculating a square root of the d-axis current feedback squared and the q-axis current feedback squared to obtain a stator current feedback; subtracting the stator current feedback from a stator current command to obtain a stator current error; transmitting the stator current error to a proportional-integral controller to generate a present compensation stator resistance estimating value; adding the present compensation stator resistance estimating value and a previous stator resistance estimating value to obtain the present stator resistance estimating value.

In one embodiment, the processor further performs the following actions: subtracting a speed feedback from the speed command to obtain a speed error; generating a d-axis current command and a q-axis current command through the d-q axis current regulator and the current current-angle command; subtracting the d-axis current feedback and the q-axis current feedback from the d-axis current command and the q-axis current command to send to a current proportional-integral controller, subtracting a decoupling parameter from an output of the current proportional-integral controller, and adding another decoupling parameter to another output of the current proportional-integral controller, so as to obtain a d-axis voltage command and a q-axis voltage command; transforming the d-axis voltage command and the q-axis voltage command into a α-axis voltage command and a β-axis voltage command; transforming the α-axis voltage command and the β-axis voltage command into a three-phase voltage command, so as to control a frequency converter by a space vector pulse width modulation, where the frequency converter is electrically connected to the motor.

In one embodiment, the processor further performs the following actions: converting an analog current from feedback between the frequency converter and the motor into a three-phase current feedback; transforming the three-phase current feedback into the α-axis current feedback and the β-axis current feedback; transforming the α-axis current feedback and the β-axis current feedback into the d-axis current feedback and the q-axis current feedback.

Another embodiment of the present disclosure is related to a motor control method including steps of: calculating the d-axis magnetic flux and the q-axis magnetic flux in a synchronous rotating reference frame according to the information fed back by the motor; multiplying the d-axis magnetic flux and the q-axis magnetic flux by a d-axis current feedback and a q-axis current feedback to be a d-axis flux-current product and a q-axis flux-current product respectively; subtracting the q-axis flux-current product from the d-axis flux-current product to get a flux-current product error; sending the flux-current product error to a proportional-integral controller to generate a present compensation current-angle command; adding the present compensation current-angle command and a previous current-angle command to obtain the present current-angle command; sending the present current-angle command to a d-q axis current regulator for processing.

In one embodiment, the motor control method further includes steps of: multiplying a present stator resistance estimating value by a α-axis current feedback in a stationary reference frame to obtain a α-axis resistance current product; multiplying a present stator resistance estimating value by a β-axis current feedback in a stationary reference frame to obtain a β-axis resistance current product; subtracting the α-axis resistance current product and the β-axis resistance current product from a α-axis voltage command and a β-axis voltage command to obtain an α-axis back electromotive force and a β-axis back electromotive force; transmitting the α-axis back electromotive force and the β-axis back electromotive force to integrators to generate a α-axis magnetic flux and a β-axis magnetic flux, respectively; transforming the α-axis magnetic flux and the β-axis magnetic flux into the d-axis magnetic flux and the q-axis magnetic flux through a coordinate axis transformation of α-β axis to d-q axis and an electrical angle.

In one embodiment, the motor control method further includes steps of: calculating a square root of the d-axis current feedback squared and the q-axis current feedback squared to obtain a stator current feedback; subtracting the stator current feedback from a stator current command to obtain a stator current error; transmitting the stator current error to a proportional-integral controller to generate a present compensation stator resistance estimating value; adding the present compensation stator resistance estimating value and a previous stator resistance estimating value to obtain the present stator resistance estimating value.

In one embodiment, the motor control method further includes steps of: subtracting a speed feedback from the speed command to obtain a speed error; generating a d-axis current command and a q-axis current command through the d-q axis current regulator and the present current-angle command; subtracting the d-axis current feedback and the q-axis current feedback from the d-axis current command and the q-axis current command to send to a current proportional-integral controller, subtracting a decoupling parameter from an output of the current proportional-integral controller, and adding another decoupling parameter to another output of the current proportional-integral controller, so as to obtain a d-axis voltage command and a q-axis voltage command; transforming the d-axis voltage command and the q-axis voltage command into a α-axis voltage command and a β-axis voltage command; transforming the α-axis voltage command and the β-axis voltage command into a three-phase voltage command, so as to control a frequency converter by a space vector pulse width modulation, where the frequency converter is electrically connected to the motor.

In one embodiment, the motor control method further includes steps of: converting an analog current from feedback between the frequency converter and the motor into a three-phase current feedback; transforming the three-phase current feedback into the α-axis current feedback and the β-axis current feedback; transforming the α-axis current feedback and the β-axis current feedback into the d-axis current feedback and the q-axis current feedback.

In view of the above, the present disclosure provides a motor control system and method that avoids the offline pre-preparation of the conventional maximum power factor method, and can automatically adjust the power factor of the motor by the current angle, so as to further improve the performance of the maximum power factor control.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows:

FIG. 3 is a flow chart illustrating a motor control method according to some embodiments of the present disclosure.

DETAILED DESCRIPTION

Figure 1:
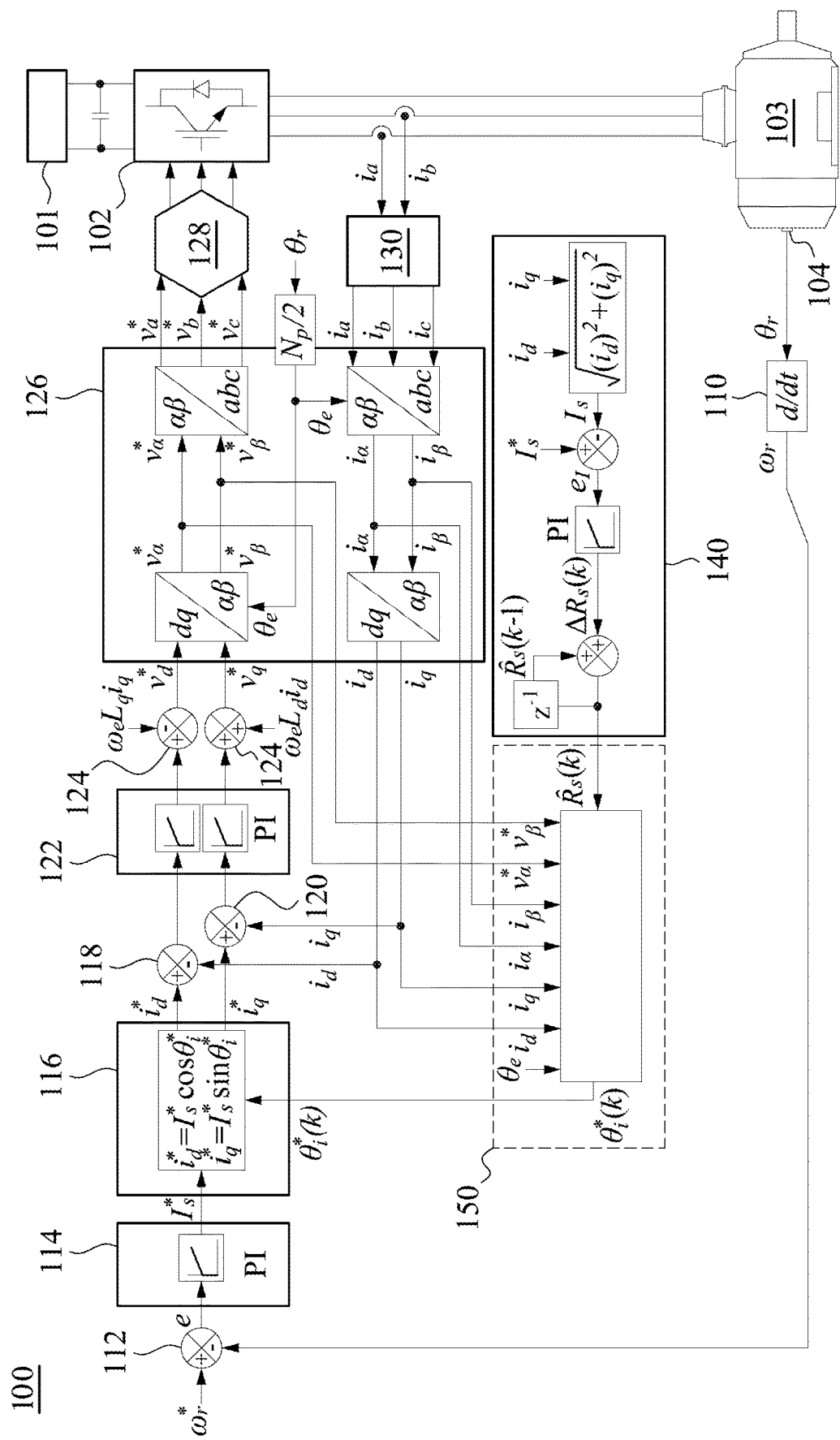
FIG. 1 is a block diagram illustrating a motor control system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a motor control system 100 according to some embodiments of the present disclosure. As shown in FIG. 1, a rectifier 101 is electrically connected to a frequency converter 102. The frequency converter 102 is electrically connected to a motor 103 (e.g., a synchronous reluctance motor), and the motor 103 has a position encoder 104.

In practice, an arithmetic unit 110, an arithmetic unit 112, a speed proportional integral controller 114, a d-q axis current regulator 116, an arithmetic unit 118, an arithmetic unit 120, a current proportional integral controller 122, an arithmetic unit 124, a coordinate transformation 126, space vector pulse width modulation 128, an analog digital converter 130, a stator resistance estimator 140 and a current-angle control based maximum power factor controller 150 can be integrated into software program and/or a hardware circuit of a processor (e.g., digital signal processor, single chip microprocessor, or the like), and the processor is electrically connected to the motor 103.

Figure 2:
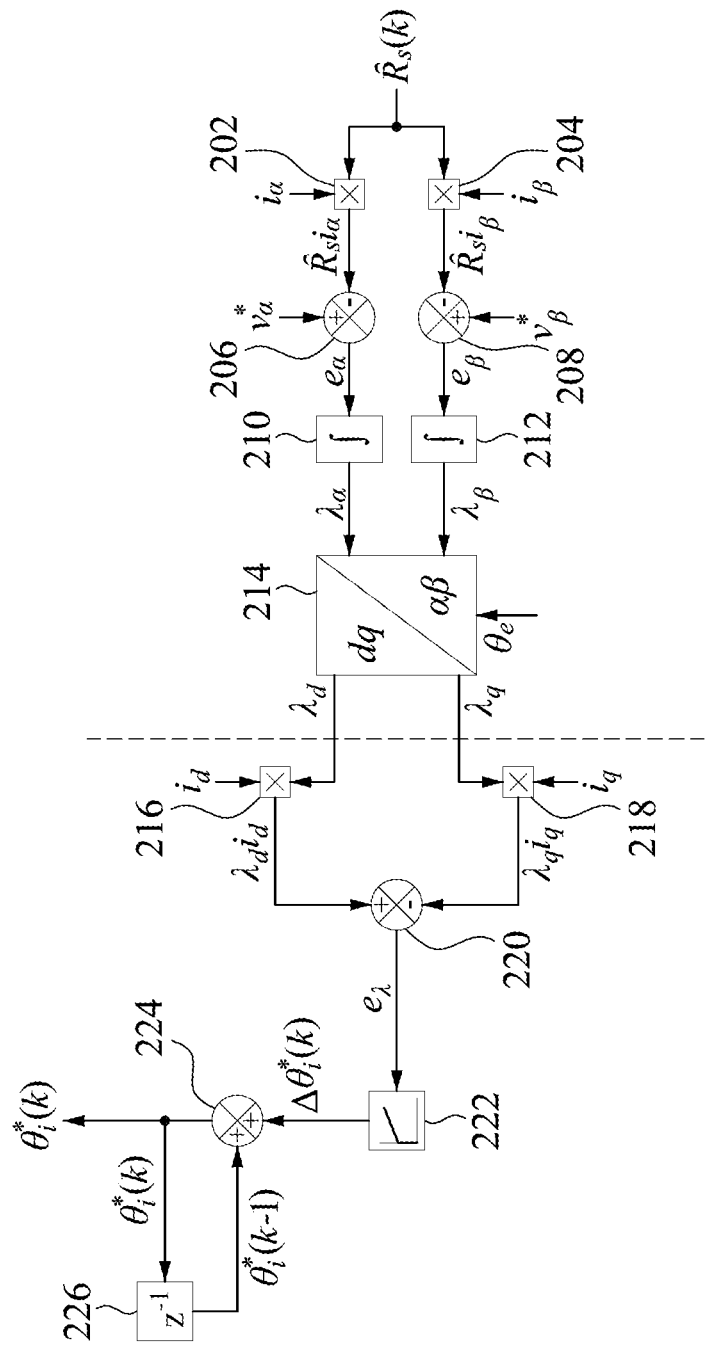
FIG. 2 is a block diagram illustrating a current-angle control based maximum power factor controller according to some embodiments of the present disclosure.

FIG. 2 is a block diagram illustrating a current-angle control based maximum power factor controller according to some embodiments of the present disclosure. As shown in FIG. 2, the current-angle control based maximum power factor controller 150 includes an arithmetic unit 202, an arithmetic unit 204, an arithmetic unit 206, an arithmetic unit 208, an integrator 210, an integrator 212, a coordinate axis transformation 214 of α-β axis to d-q axis, an arithmetic unit 216, an arithmetic unit 218, an arithmetic unit 220, a proportional integral The controller 222, an arithmetic unit 224 and an arithmetic unit 226.

Referring FIGS. 1-2, the processor calculates the d-axis magnetic flux $\lambda_d$ and the q-axis magnetic flux $\lambda_q$ in a synchronous rotating reference frame (e.g., d-q reference frame) according to the information fed back by the motor 103. In the current-angle control based maximum power factor controller 150, the arithmetic units 216 and 218 multiplies the d-axis magnetic flux $\lambda_d$ and the q-axis magnetic flux $\lambda_q$ by a d-axis current feedback $i_d$ and a q-axis current feedback $i_q$ to be a d-axis flux-current product $\lambda_d i_d$ and a q-axis flux-current product respectively. The arithmetic unit 220 subtracts the q-axis flux-current product $\lambda_q i_q$ from the d-axis flux-current product $\lambda_d i_d$ to get a flux-current product error $e_\lambda$. The arithmetic unit 220 sends the flux-current product error $e_\lambda$ to the proportional-integral controller 222 to generate a present compensation current-angle command $\Delta\theta^*_i(k)$ (e.g., the k th compensation current-angle command). The arithmetic unit 224 adds the present compensation current-angle command $\Delta\theta^*_i(k)$ and a previous current-angle command $\theta^*_i(k-1)$ (e.g., the k−1 th current-angle command) to obtain the present current-angle command $\theta^*_i(k)$ (e.g., the k th current-angle command). The arithmetic unit 224 sends the present current-angle command $\theta^*_i(k)$ to the d-q axis current regulator 116 for processing.

In the current-angle control based maximum power factor controller 150, the arithmetic unit 202 multiplies a present stator resistance estimating value $\hat{R}_s(k)$ by a α-axis current feedback $i_\alpha$ in a stationary reference frame (e.g., the α-β reference frame) to obtain a α-axis resistance current product $\hat{R}_s i_\alpha$. The arithmetic unit 204 multiplies the present stator resistance estimating value $\hat{R}_s(k)$ by a β-axis current feedback $i_\beta$ in the stationary reference frame to obtain a β-axis resistance current product $\hat{R}_s i_\beta$. The arithmetic units 206 and 208 subtract the α-axis resistance current product $\hat{R}_s i_\alpha$ and the β-axis resistance current product $\hat{R}_s i_\beta$ from a α-axis voltage command $v^*_\alpha$ and a β-axis voltage command $v^*_\beta$ to obtain an α-axis back electromotive force $e_\alpha$ and a β-axis back electromotive force $e_\beta$. The arithmetic units 206 and 208 transmit the α-axis back electromotive force $e_\alpha$ and the β-axis back electromotive force $e_\beta$ to integrators 210 and 212 to generate a α-axis magnetic flux $\lambda_\alpha$ and a β-axis magnetic flux $\lambda_\beta$ respectively. The α-axis magnetic flux $\lambda_\alpha$ and the β-axis magnetic flux $\lambda_\beta$ are converted into the d-axis magnetic flux $\lambda_d$ and the q-axis magnetic flux $\lambda_q$ through the coordinate axis transformation 214 of α-β axis to d-q axis and an electrical angle $\theta_e$. The mechanical angle provided by the position encoder 104 electrical angle $\theta_e$ is multiplied by number of poles $N_P$ of the motor 103 and then divided by 2 to equal the electrical angle $\theta_e$.

The stator resistance estimator 140 performs the following actions: calculating a square root of the d-axis current feedback $i_d$ squared and the q-axis current feedback $i_q$ squared to obtain a stator current feedback $I_s$; subtracting the stator current feedback $I_s$ from a stator current command $I^*_s$ to obtain a stator current error $e_I$; transmitting the stator current error $e_I$ to the proportional-integral controller PI to generate a present compensation stator resistance estimating value $\Delta R_s(k)$; adding the present compensation stator resistance estimating value $\Delta R_s(k)$ and a previous stator resistance estimating value $\hat{R}_s(k-1)$ to obtain the present stator resistance estimating value $\hat{R}_s(k)$.

In FIG. 1, the arithmetic unit 110 differentiates the mechanical angle $\theta_r$ provided by the position encoder 104 to obtain a speed feedback $\omega_r$. The arithmetic unit 112 subtracts the speed feedback $\omega_r$ of the motor 103 from the speed command $\omega^*_r$ to obtain a speed error e. A d-axis current command $i^*_d$ and a q-axis current command $i^*_q$ are generated through the d-q axis current regulator 116 and the present current-angle command $\theta^*_i(k)$. The d-q axis current regulator 116 subtracts the d-axis current feedback and the q-axis current feedback from the d-axis current command $i^*_d$ and the q-axis current command $i^*_q$ to send to the current proportional-integral controller 122, and the arithmetic unit 124 subtracts a decoupling parameter $\omega_e L_q i_q$ from an output of the current proportional-integral controller 122 and adds another decoupling parameter $\omega_e L_d i_d$ to another output of the current proportional-integral controller 122, so as to obtain a d-axis voltage command and a q-axis voltage command. The coordinate transformation 126 converts the d-axis voltage command and the q-axis voltage command into a α-axis voltage command $v^*_\alpha$ and a β-axis voltage command $v^*_\beta$. The coordinate transformation 126 converts the α-axis voltage command $v^*_\alpha$ and the β-axis voltage command $v^*_\beta$ into three-phase voltage commands $v^*_a$, $v^*_b$, $v^*_c$, so as to control a frequency converter 102 by the space vector pulse width modulation 128, where the frequency converter 102 is electrically connected to the motor 103.

In FIG. 1, the analog digital converter 130 converts an analog current $i_a$, $i_b$ from feedback between the frequency converter 102 and the motor 103 into a three-phase current feedback $i_a$, $i_b$, $i_c$. The coordinate transformation 126 converts the three-phase current feedback $i_a$, $i_b$, $i_c$ into the α-axis current feedback $i_\alpha$ and the β-axis current feedback $i_\beta$. The coordinate transformation 126 converts the α-axis current feedback $i_\alpha$ and the β-axis current feedback $i_\beta$ into the d-axis current feedback $i_d$ and the q-axis current feedback $i_q$.

For a more complete understanding of operating the motor control system 100, referring FIGS. 1-3, FIG. 3 is a flow chart illustrating a motor control method 300 according to some embodiments of the present disclosure. As shown in FIG. 3, the motor control method 300 includes operations S301 to S306. However, as could be appreciated by persons having ordinary skill in the art, for the steps described in the present embodiment, the sequence in which these steps are performed, unless explicitly stated otherwise, can be altered depending on actual needs; in certain cases, all or some of these steps can be performed concurrently.

The operation S301 is to calculate the d-axis magnetic flux $\lambda_d$ and the q-axis magnetic flux $\lambda_q$ in a synchronous rotating reference frame (e.g., d-q reference frame) according to the information fed back by the motor 103.

The operation S302 is to multiply the d-axis magnetic flux $\lambda_d$ and the q-axis magnetic flux $\lambda_q$ by a d-axis current feedback $i_d$ and a q-axis current feedback $i_q$ to be a d-axis flux-current product $\lambda_d i_d$ and a q-axis flux-current product respectively.

The operation S303 is to subtract the q-axis flux-current product $\lambda_q i_q$ from the d-axis flux-current product $\lambda_d i_d$ to get a flux-current product error $e_\lambda$.

The operation S304 is to send the flux-current product error $e_\lambda$ to the proportional-integral controller 222 to generate a present compensation current-angle command $\Delta\theta^*_i(k)$ (e.g., the k th compensation current-angle command).

The operation S305 is to add the present compensation current-angle command $\Delta\theta^*_i(k)$ and a previous current-angle command $\theta^*_i(k-1)$ (e.g., the k−1 th current-angle command) to obtain the present current-angle command $\theta^*_i(k)$ (e.g., the k th current-angle command).

The operation S306 is to send the present current-angle command $\theta^*_i(k)$ to the d-q axis current regulator 116 for processing.

In the current-angle control based maximum power factor controller 150, the arithmetic unit 202 multiplies a present stator resistance estimating value $\hat{R}_s(k)$ by a α-axis current feedback $i_\alpha$ in a stationary reference frame (e.g., the α-β reference frame) to obtain a α-axis resistance current product $\hat{R}_s i_\alpha$. The arithmetic unit 204 multiplies the present stator resistance estimating value $\hat{R}_s(k)$ by a β-axis current feedback $i_\beta$ in the stationary reference frame to obtain a β-axis resistance current product $\hat{R}_s i_\beta$. The arithmetic units 206 and 208 subtract the α-axis resistance current product $\hat{R}_s i_\alpha$ and the β-axis resistance current product $\hat{R}_s i_\beta$ from a α-axis voltage command $v^*_\alpha$ and a β-axis voltage command $v^*_\beta$ to obtain an α-axis back electromotive force $e_\alpha$ and a β-axis back electromotive force $e_\beta$. The arithmetic units 206 and 208 transmit the α-axis back electromotive force $e_\alpha$ and the β-axis back electromotive force $e_\beta$ to integrators 210 and 212 to generate a α-axis magnetic flux $\lambda_\alpha$ and a β-axis magnetic flux $\lambda_\beta$ respectively. The α-axis magnetic flux $\lambda_\alpha$ and the β-axis magnetic flux $\lambda_\beta$ are converted into the d-axis magnetic flux $\lambda_d$ and the q-axis magnetic flux $\lambda_q$ through the coordinate axis transformation 214 of α-β axis to d-q axis and an electrical angle $\theta_e$. The mechanical angle provided by the position encoder 104 electrical angle $\theta_e$ is multiplied by number of poles $N_P$ of the motor 103 and then divided by 2 to equal the electrical angle $\theta_e$.

The motor control method 300 further includes steps of: calculating a square root of the d-axis current feedback $i_d$ squared and the q-axis current feedback $i_q$ squared to obtain a stator current feedback $I_s$; subtracting the stator current feedback $I_s$ from a stator current command $I^*_s$ to obtain a stator current error $e_I$; transmitting the stator current error $e_I$ to the proportional-integral controller PI to generate a present compensation stator resistance estimating value $\Delta R_s(k)$; adding the present compensation stator resistance estimating value $\Delta R_s(k)$ and a previous stator resistance estimating value $\hat{R}_s(k-1)$ to obtain the present stator resistance estimating value $\hat{R}_s(k)$.

The motor control method 300 further includes steps of: differentiating the mechanical angle $\theta_r$ provided by the position encoder 104 to obtain a speed feedback $\omega_r$; subtracting the speed feedback $\omega_r$ of the motor 103 from the speed command $\omega^*_r$ to obtain a speed error e; generating a d-axis current command $i^*_d$ and a q-axis current command $i^*_q$ through the d-q axis current regulator 116 and the present current-angle command $\theta^*_i(k)$; using the d-q axis current regulator 116 to subtract the d-axis current feedback and the q-axis current feedback from the d-axis current command $i^*_d$ and the q-axis current command $i^*_q$ to send to the current proportional-integral controller 122, subtracting a decoupling parameter $\omega_e L_q i_q$ from an output of the current proportional-integral controller 122, and adding another decoupling parameter $\omega_e L_d i_d$ to another output of the current proportional-integral controller 122, so as to obtain a d-axis voltage command and a q-axis voltage command; transforming the d-axis voltage command and the q-axis voltage command into a α-axis voltage command $v^*_\alpha$ and a β-axis voltage command $v^*_\beta$; transforming the α-axis voltage command $v^*_\alpha$ and the β-axis voltage command $v^*_\beta$ into three-phase voltage commands $v^*_a, v^*_b, v^*_c$, so as to control a frequency converter 102 by the space vector pulse width modulation 128, where the frequency converter 102 is electrically connected to the motor 103.

The motor control method 300 further includes steps of: converting an analog current $i_a$, $i_b$ from feedback between the frequency converter 102 and the motor 103 into a three-phase current feedback $i_a$, $i_b$, $i_c$; transforming the three-phase current feedback $i_a$, $i_b$, $i_c$ into the α-axis current feedback $i_\alpha$ and the β-axis current feedback $i_\beta$; transforming the α-axis current feedback $i_\alpha$ and the β-axis current feedback $i_\beta$ into the d-axis current feedback $i_d$ and the q-axis current feedback $i_q$.

In view of the above, the present disclosure provides a motor control system and method that avoids the offline pre-preparation of the conventional maximum power factor method, and can automatically adjust the power factor of the motor by the current-angle, so as to further improve the performance of the maximum power factor control.

The control signal required by the present disclosure is a magnetic field control of d-q axis voltage, and current commands. Therefore, in the process of obtaining the control signal, the present disclosure only uses the original device, thereby avoiding the modification of the hardware. The motor control method of the present disclosure can be used in the existing equipment to achieve the maximum power factor control so that a power factor improvement with good cost-down efficiency can be achieved. Furthermore, considering that the salient pole ratio of each synchronous reluctance motor is extremely different, and a cumbersome offline measurement is required to get the salient pole ratio of the motor, so that the conventional maximum power factor control is difficult to be accomplished. The present disclosure can adjust the appropriate current-angle command online to achieve the maximum power factor control, without getting the salient pole ratio of the synchronous reluctance motor, and the power factor improvement process is quite.

The processor of the present disclosure can use a digital signal processor or a single-chip microprocessor to complete the synchronous reluctance motor drive, and uses magnetic field control as the main control architecture, and cooperates with the maximum power factor control technology proposed by the present disclosure; therefore, the function of controlling the maximum power factor of the synchronous reluctance motor can be achieved. The control technology proposed by the disclosure can be used to start the synchronous reluctance motor, does not need to perform any mode switching before reaching the rated speed of the motor, and can operate effectively under different speeds and loads.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor control system, comprising:
a motor;
a frequency converter is electrically connected to the motor; and
a processor electrically connected to the motor, the processor configured for:
calculating a d-axis magnetic flux and a q-axis magnetic flux in a synchronous rotating reference frame according to the information fed back by the motor;
multiplying the d-axis magnetic flux and the q-axis magnetic flux by a d-axis current feedback and a q-axis current feedback to be a d-axis flux-current product and a q-axis flux-current product respectively;
subtracting the q-axis flux-current product from the d-axis flux-current product to get a flux-current product error;
sending the flux-current product error to a proportional-integral controller to generate a present compensation current-angle command;
adding the present compensation current-angle command and a previous current-angle command to obtain the present current-angle command;
sending the present current-angle command to a d-q axis current regulator to generate a d-axis current command and a q-axis current command through the d-q axis current regulator and the current current-angle command;
subtracting the d-axis current feedback and the q-axis current feedback from the d-axis current command and the q-axis current command to send to a current proportional-integral controller, subtracting a decoupling parameter from an output of the current proportional-integral controller, and adding another decoupling parameter to another output of the current proportional-integral controller to obtain a d-axis voltage command and a q-axis voltage command;
converting the d-axis voltage command and the q-axis voltage command into a α-axis voltage command and a β-axis voltage command; and
transforming the α-axis voltage command and the β-axis voltage command into a three-phase voltage command, so as to control the frequency converter by a space vector pulse width modulation to control the motor.

2. The motor control system of claim 1, wherein the processor is further configured for:
multiplying a present stator resistance estimating value by a α-axis current feedback in a stationary reference frame to obtain a α-axis resistance current product;
multiplying the present stator resistance estimating value by a β-axis current feedback in a stationary reference frame to obtain a β-axis resistance current product;
subtracting the α-axis resistance current product and the β-axis resistance current product from the α-axis voltage command and the β-axis voltage command to obtain an α-axis back electromotive force and a β-axis back electromotive force;
transmitting the α-axis back electromotive force and the β-axis back electromotive force to integrators to generate a α-axis magnetic flux and a β-axis magnetic flux respectively; and
transforming the α-axis magnetic flux and the β-axis magnetic flux into the d-axis magnetic flux and the q-axis magnetic flux through a coordinate axis transformation of α-β axis to d-q axis and an electrical angle.

3. The motor control system of claim 2, wherein the processor is further configured for:
calculating a square root of the d-axis current feedback squared and the q-axis current feedback squared to obtain a stator current feedback;
subtracting the stator current feedback from a stator current command to obtain a stator current error;
transmitting the stator current error to a proportional-integral controller to generate a present compensation stator resistance estimating value; and
adding the present compensation stator resistance estimating value and a previous stator resistance estimating value to obtain the present stator resistance estimating value.

4. The motor control system of claim 1, wherein the processor is further configured for:
converting an analog current from feedback between the frequency converter and the motor into a three-phase current feedback;
transforming the three-phase current feedback into the α-axis current feedback and the β-axis current feedback; and
transforming the α-axis current feedback and the β-axis current feedback into the d-axis current feedback and the q-axis current feedback.

5. A motor control method, comprising:
calculating a d-axis magnetic flux and a q-axis magnetic flux in a synchronous rotating reference frame according to information fed back by a motor;
multiplying the d-axis magnetic flux and the q-axis magnetic flux by a d-axis current feedback and a q-axis current feedback to be a d-axis flux-current product and a q-axis flux-current product respectively;
subtracting the q-axis flux-current product from the d-axis flux-current product to get a flux-current product error;
sending the flux-current product error to a proportional-integral controller to generate a present compensation current-angle command;
adding the present compensation current-angle command and a previous current-angle command to obtain the present current-angle command;
sending the present current-angle command to a d-q axis current regulator to generate a d-axis current command and a q-axis current command through the d-q axis current regulator and the current current-angle command;
subtracting the d-axis current feedback and the q-axis current feedback from the d-axis current command and the q-axis current command to send to a current proportional-integral controller, subtracting a decoupling parameter from an output of the current proportional-integral controller, and adding another decoupling parameter to another output of the current proportional-integral controller to obtain a d-axis voltage command and a q-axis voltage command;
converting the d-axis voltage command and the q-axis voltage command into a α-axis voltage command and a β-axis voltage command; and
transforming the α-axis voltage command and the β-axis voltage command into a three-phase voltage command, so as to control the frequency converter by a space vector pulse width modulation to control the motor.

6. The motor control method of claim 5, further comprising:

multiplying a present stator resistance estimating value by a α-axis current feedback in a stationary reference frame to obtain a α-axis resistance current product;

multiplying the present stator resistance estimating value by a β-axis current feedback in a stationary reference frame to obtain a β-axis resistance current product;

subtracting the α-axis resistance current product and the β-axis resistance current product from the α-axis voltage command and the β-axis voltage command to obtain an α-axis back electromotive force and a β-axis back electromotive force;

transmitting the α-axis back electromotive force and the β-axis back electromotive force to integrators to generate a α-axis magnetic flux and a β-axis magnetic flux, respectively;

transforming the α-axis magnetic flux and the β-axis magnetic flux into the d-axis magnetic flux and the q-axis magnetic flux through a coordinate axis transformation of α-β axis to d-q axis and an electrical angle.

7. The motor control method of claim 6, further comprising:

calculating a square root of the d-axis current feedback squared and the q-axis current feedback squared to obtain a stator current feedback;

subtracting the stator current feedback from a stator current command to obtain a stator current error;

transmitting the stator current error to a proportional-integral controller to generate a present compensation stator resistance estimating value; and adding the present compensation stator resistance estimating value and a previous stator resistance estimating value to obtain the present stator resistance estimating value.

8. The motor control method of claim 5, further comprising:

converting an analog current from feedback between the frequency converter and the motor into a three-phase current feedback;

transforming the three-phase current feedback into the α-axis current feedback and the β-axis current feedback; and transforming the α-axis current feedback and the β-axis current feedback into the d-axis current feedback and the q-axis current feedback.

* * * * *